US012306195B2

United States Patent
Shiga et al.

(10) Patent No.: US 12,306,195 B2
(45) Date of Patent: May 20, 2025

(54) SAMPLE TRANSPORTING DEVICE, SYSTEM AND METHOD (71) Applicant: Hitachi High-Tech Corporation, Tokyo (JP)

(72) Inventors: Yuichiro Shiga, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 933 days.

(21) Appl. No.: 17/280,575

(22) PCT Filed: Sep. 24, 2019

(86) PCT No.: PCT/JP2019/037176
§ 371 (c)(1),
(2) Date: Mar. 26, 2021

(87) PCT Pub. No.: WO2020/066965
PCT Pub. Date: Apr. 2, 2020

(65) Prior Publication Data
US 2022/0034920 A1 Feb. 3, 2022

(30) Foreign Application Priority Data
Sep. 27, 2018 (JP) ................. 2018-181723

(51) Int. Cl.
G01N 35/00 (2006.01)
G01N 35/02 (2006.01)
G01N 35/04 (2006.01)

(52) U.S. Cl.
CPC ..... G01N 35/00584 (2013.01); G01N 35/021 (2013.01); G01N 35/04 (2013.01);
(Continued)

(58) Field of Classification Search
CPC .......... G01N 35/00584; G01N 35/021; G01N 35/04; G01N 2035/0406; G01N 2035/0493; B65G 43/08; B65G 2201/0261
See application file for complete search history.

(56) References Cited

U.S. PATENT DOCUMENTS 5,141,097 A * 8/1992 Oiry ................ B65G 47/31
198/444
2002/0063037 A1 5/2002 Bruun et al.
2013/0260448 A1* 10/2013 Wilson ............... G01B 11/14
356/614

FOREIGN PATENT DOCUMENTS

CN 105217271 A 1/2016
JP 6-308134 A 11/1994
(Continued)

OTHER PUBLICATIONS

Extended European Search Report issued in European Application No. 19867485.5 dated Jun. 15, 2022 (10 pages).
(Continued)

Primary Examiner — John McGuirk
(74) Attorney, Agent, or Firm — Crowell & Moring LLP (57) ABSTRACT In sample transporting devices, the operation sound of a belt conveyor and the driving sound of a drive motor are caused by operating a transporting line when transporting samples, and reducing the driving sound and operation sound is required. In the present invention, a detection signal of the detection sensor 309 is detected by a detection unit 310, and a control unit 111 performs controlling to change the current value and the driving frequency of a belt driving motor 304 of a transporting line 301 and change the driving torque and the driving rotary speed of the transporting line on the basis of the amount and number of samples transported by a belt 303, wherein the amount and number of samples transported
(Continued)

by the belt can be obtained by the detection signal or a sample amount measured by a sample transporting system. Accordingly, noise reduction is achieved by driving the belt driving motor under suitable conditions according to the amount and number of the samples transported by the transporting line, and reducing the operation sound of the belt driving motor or mechanisms and the like.

5 Claims, 5 Drawing Sheets

(52) U.S. Cl.
CPC ............... *G01N 2035/0406* (2013.01); *G01N 2035/0493* (2013.01)

(56) References Cited

FOREIGN PATENT DOCUMENTS

| JP | 2006-300847 A | 11/2006 |
|---|---|---|
| JP | 2008-51578 A | 3/2008 |
| JP | 2013190388 A * | 9/2013 |
| JP | 2015-75343 A | 4/2015 |
| JP | 2015-519544 A | 7/2015 |
| JP | 2017-167038 A | 9/2017 |

OTHER PUBLICATIONS

Japanese-language Office Action issued in Japanese Application No. 2020-549187 dated Apr. 5, 2022 with English translation (ten (10) pages).

International Search Report (PCT/ISA/210) issued in PCT Application No. PCT/JP2019/037176 dated Dec. 24, 2019 with English translation (five (5) pages).

Japanese-language Written Opinion (PCT/ISA/237) issued in PCT Application No. PCT/JP2019/037176 dated Dec. 24, 2019 (three (3) pages).

* cited by examiner

SAMPLE TRANSPORTING DEVICE, SYSTEM AND METHOD

TECHNICAL FIELD

The present invention relates to a sample transporting device, and particularly relates to a sample preprocessing system and a sample transporting technology including an automatic analysis system.

BACKGROUND ART

Examples of a sample processing system that automatically analyzes a sample, which is a biological sample such as blood and urine include a sample preprocessing system that charges or centrifuges a sample, performs a dispensing process, and a labeling process, and an automatic analysis system that analyzes the sample processed in the sample preprocessing system.

In order to transport the sample to a mechanism that performs a predetermined process or analysis, the sample preprocessing system and the automatic analysis system each include a transporting line of a sample in a technique using a belt conveyer or the like. The plurality of transporting lines are mounted on the sample transporting device to transport the sample to a predetermined mechanism. Examples of a document in the related art relating to such a sample transporting device include JP-A-2017-167038 (PTL 1) that discloses a sample transporting system in which a plurality of transporting lines with different heights are connected.

CITATION LIST

Patent Literature

PTL 1: JP-A-2017-167038

SUMMARY OF INVENTION

Technical Problem

A transporting line by a belt conveyer technique using a sample transporting device in the related art causes an operation sound of a rotating belt conveyer or a driving sound of a motor that drives the belt conveyer when the belt conveyer operates. Therefore, by simultaneously operating the plurality of connected transporting lines, caused driving sounds or operation sounds are overlapped with each other. According to the number or the weights of the samples transported to the plurality of transporting lines in practice, the size of the caused and overlapped driving sounds or the operation sounds changes. Therefore, a sample transporting technology in which the driving sounds or the operation sounds are reduced indoors where the automatic analysis system or the like is installed to improve the environment when the system is used is required.

In order to solve the above problem, an object of the present invention is to provide a sample transporting device that can reduce noises or operation sounds, a sample transporting system, and a method of transporting a sample.

Solution to Problem

In order to achieve the object, according to the present invention, provided is a sample transporting device including: a transport unit that transports a sample to a predetermined position; a driving unit that drives the transport unit; a drive control unit that controls the driving unit by a driving frequency, current; a detection unit that detects the sample on the transport unit; and a control unit that processes a sample detection signal of the detection unit, in which the control unit outputs a value of driving frequency, current selected based on a result obtained by processing the sample detection signal to the drive control unit and controls so that the driving unit is driven by the selected driving frequency, current, and also a sample transporting system using the sample transporting device.

Also, in order to achieve the above object, according to the present invention, provided is a method of transporting a sample, including: transporting the sample to a predetermined position by using a transport unit driven by a driving unit controlled by a driving frequency, current, detecting the sample on the transport unit by a detection unit; and performing control so that the driving unit is driven according to a value of the driving frequency, current selected based on a result obtained by processing a sample detection signal of the detection unit by a control unit.

Advantageous Effects of Invention

According to the present invention, noise reduction of the sample transporting device and the system can be achieved by driving the driving unit under suitable conditions according to the amount and number of the transported samples.

DESCRIPTION OF EMBODIMENTS

An embodiment of the present invention is described in detail with reference to the drawings. It is obvious that, in the following embodiments, the components (including element steps and the like) are not necessarily essential unless otherwise specified or clearly considered to be essential in principle. Further, in all the drawings for explaining the embodiments, the same members are, in principle, denoted by the same reference numerals, and the repeated description thereof is omitted. In the present specification, the expression "driving frequency, current" refers to a driving frequency or a current, or both of a driving frequency and a current.

Embodiment 1

Embodiment 1 is an embodiment of a sample transporting device, a system, and a method that include transporting lines. That is, the present embodiment is an embodiment of a sample transporting device including: a transport unit that transports a sample to a predetermined position; a driving unit that drives the transport unit; a drive control unit that controls the driving unit by a driving frequency, current; a detection unit that detects the sample on the transport unit; and a control unit that processes a sample detection signal of the detection unit, in which the control unit outputs a value of driving frequency, current selected based on a result obtained by processing the sample detection signal to the drive control unit and controls so that the driving unit is driven by the selected driving frequency, current, a sample transporting system using the corresponding sample transporting device, and a method of transporting a sample.

Figure 1:
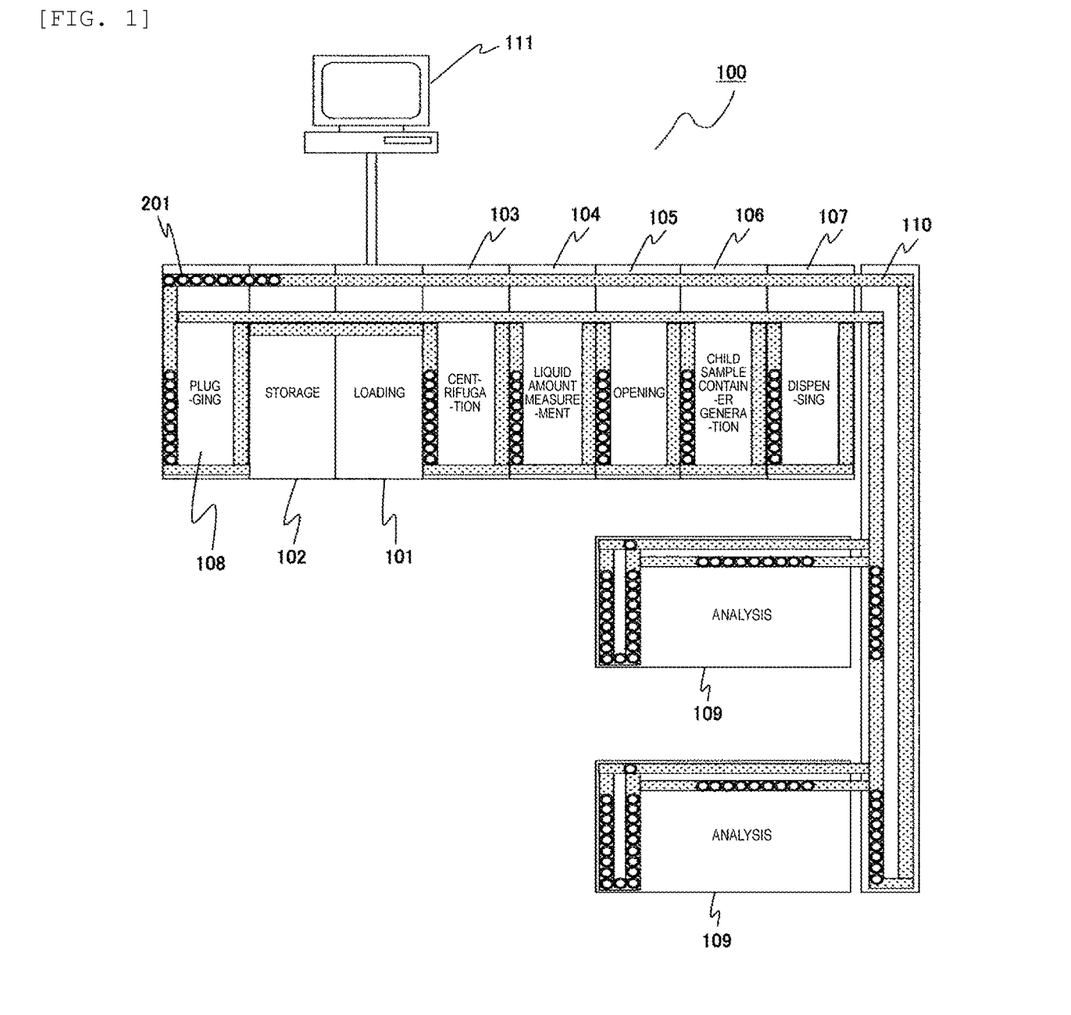
FIG. 1 is a diagram illustrating a configuration example of the entire sample transporting system according to Embodiment 1.
Figure 2:
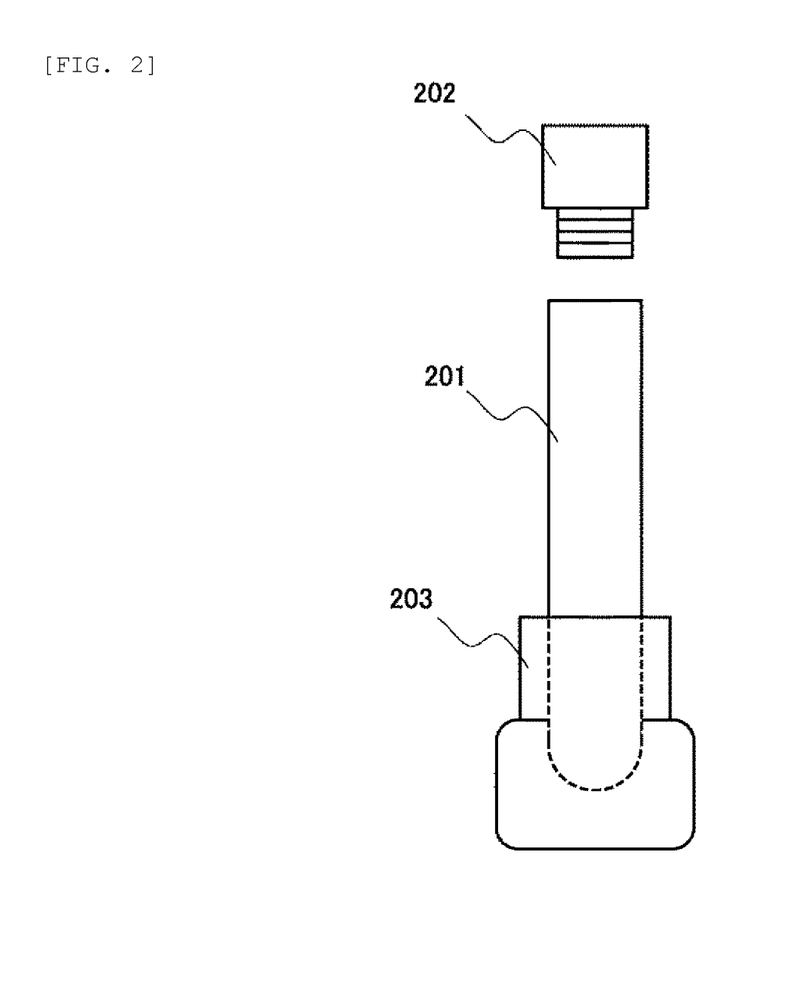
FIG. 2 is a cross-sectional view illustrating a configuration example of a sample container used in the sample transporting system according to Embodiment 1.

First, with reference to FIGS. 1 and 2, a sample transporting system to which a sample transporting device of Embodiment 1 is applied is described. FIG. 1 is a diagram illustrating one configuration example of the entire sample transporting system according to Embodiment 1, and FIG. 2 is a diagram illustrating one configuration example of a sample container used for the sample transporting system of Embodiment 1.

In FIG. 1, a sample transporting system 100 configures an automatic analysis system that automatically analyzes components of a sample such as blood or urine. The sample transporting system 100 is configured with a preprocessing unit including mechanisms such as a sample charging unit 101, a sample storage unit 102, a centrifugal processing unit 103, a liquid amount measurement processing unit 104, an opening processing unit 105, a child sample container generation processing unit 106, a dispensing processing unit 107, and a plugging processing unit 108; a sample transport unit 110 that is a sample transporting device that transports a holder on which a plurality of analysis processing units 109 that analyzes the sample of a sample container 201 subjected to preprocessing and the sample container 201 between each mechanism of the preprocessing unit and the analysis processing units 109 are mounted; and a control unit 111 that controls operations of the entire sample transporting system.

The sample charging unit 101 of the preprocessing unit is a unit that charges the sample container 201 illustrated in FIG. 2 in which the sample is contained, in the sample transporting system 100. In the sample charging unit 101, a sample recognition unit, a plug detection unit, and a sample holder recognition unit which are not illustrated are installed, and the sample charging unit 101 recognizes the container type of the transported sample container 201 of FIG. 2, the shape of a plug 202 of the container, and identifier (ID) information given to a holder 203 where the sample container 201 is built, and obtains information that specifies the transported sample container 201. The sample holder recognition units (not illustrated) are provided in various places inside the sample transporting system 100, and the location of the sample container 201 can be recognized with the sample holder recognition units in each place.

The centrifugal processing unit 103 is a unit that centrifuges the charged sample container 201. The liquid amount measurement processing unit 104 measures and determines the amount or the color of the sample that fills the transported sample container 201 with a laser light source unit and an image recognition unit (not illustrated). The opening processing unit 105 is a unit that opens the plug 202 from the charged sample container 201. The child sample container generation processing unit 106 is a unit that prepares another sample container 201 required for dispensing the sample contained in the charged sample container 201 to the next dispensing processing unit 107 and attaches a barcode or the like thereto.

The dispensing processing unit 107 is a unit that subdivides a sample to another sample container 201 prepared in the child sample container generation processing unit 106 for analyzing a sample that is not centrifuged or a centrifuged sample with the centrifugal processing unit 103 with the analysis processing unit 109 or the like. The plugging processing unit 108 is a unit that closes the plug 202 into the sample container 201 of which the plug 202 is open or the sample container 201 used for subdivision. According to the type of the plug used for closing the sample container 201, a configuration of the sample transporting system 100 including two plugging processing units 108 can be provided.

The analysis processing unit 109 is a unit for transferring the sample processed with each processing unit in the sample transporting system 100 and qualitatively and quantitatively analyzing the component of the sample. The sample storage unit 102 is a unit that stores the sample container 201 closed with the plugging processing unit 108.

The sample transport unit 110 is a mechanism that transfers the charged sample container 201 from the sample charging unit 101 or the sample container 201 used for subdivision to which the dispensing processing unit 107 dispenses the sample, to each unit in the sample transporting system 100 such as the centrifugal processing unit 103, the dispensing processing unit 107, and the analysis processing unit 109. The sample transport unit 110 includes a plurality of transporting lines and is used for transportation to each mechanism unit that performs a predetermined operation in each unit such as the centrifugal processing unit 103, the dispensing processing unit 107, and the analysis processing unit 109. The control unit 111 controls each unit in the sample transporting system 100 and the operation of each mechanism in each unit, and analyzes measurement data in the analysis processing unit 109. The control unit 111 communicates with each unit or each mechanism described above, and can recognize the location of the sample in the sample transporting system 100 from the ID information of the holder 203.

As illustrated in FIG. 2, the sample container 201 is supported by the holder 203 and transports the sample transport unit 110. The sample container 201 is sealed with the plug 202 before the opening process with the opening processing unit 105 or after the closing process with the plugging processing unit 108. In addition to the shape for insertion to the inside of the sample container 201 through an opening part on the illustrated sample container 201, the plug 202 has various kinds of shapes such as a screw shape for fixation to the sample container 201 or a seal cap shape for covering the opening part of the upper part of the sample container 201, according to the kind of the sample container 201. In the holder 203, ID information (not illustrated) is embedded, this ID information is detected, so that the location in the sample transporting system 100 can be recognized by the sample charging unit 101 and the sample holder recognition units provided at each place in the sample transporting system 100.

Figure 3:
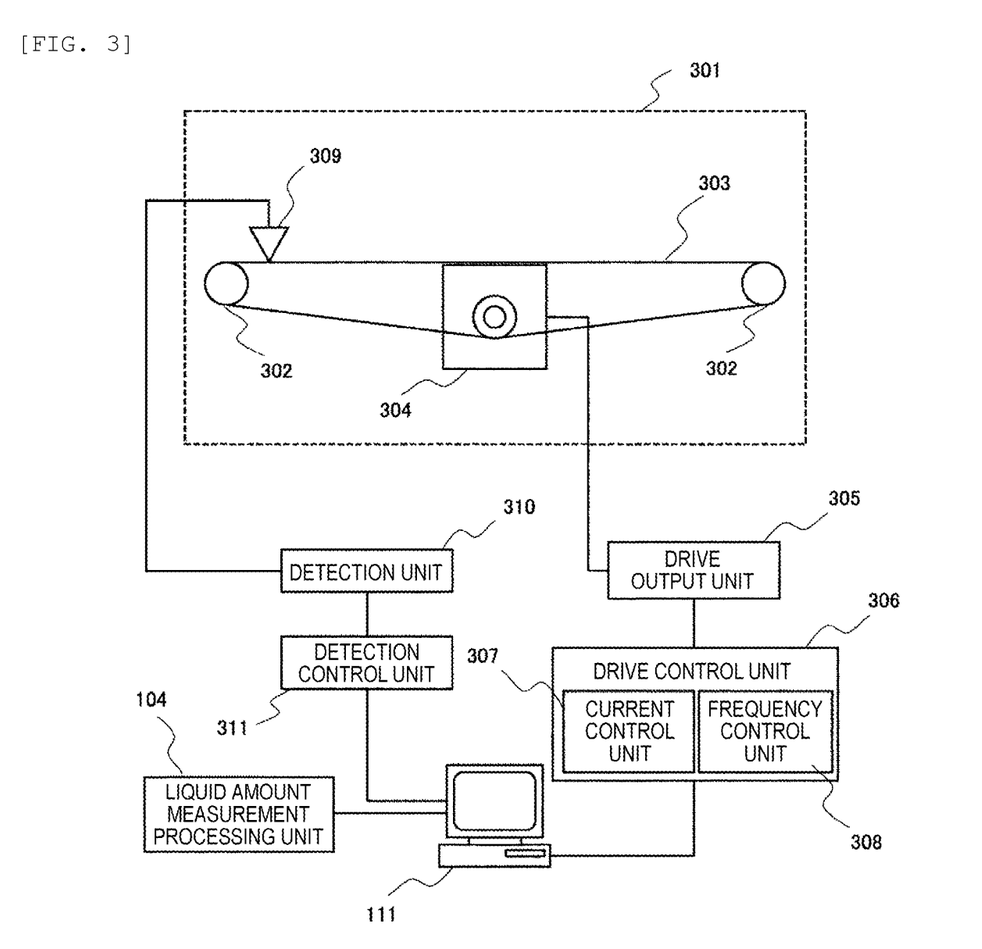
FIG. 3 is a block diagram illustrating a configuration example of a sample transporting device of Embodiment 1.

Subsequently, with reference to a block diagram of a portion near the sample transport unit illustrated in FIG. 3, one configuration example of the sample transporting device according to the present embodiment is described. In FIG. 3, a transporting line 301 of each sample transport unit 110 has a structure of providing a belt 303 between a pair of pulleys 302, installing a belt drive motor 304 on the lower part of the belt 303, and causing the belt 303 to rotate between the pair of pulleys 302 by rotation about an axis part of the belt drive motor 304. The belt 303 rotates clockwise and counterclockwise by the belt drive motor 304, and thus the sample container 201 can move between the pulleys 302 by being mounted on the belt 303.

This transporting line 301 has the length different from each unit or each mechanism in the sample transporting system 100 described above, and the plurality of transporting lines 301 with different lengths are combined to each other to form the sample transport unit 110 of FIG. 1 that transports the sample container 201 to each unit or each mechanism in the sample transporting system 100. The control unit 111 is connected to the belt drive motor 304 via a drive output unit 305 and a drive control unit 306. The control unit 111 stores drive parameter information such as a current value or a driving frequency value required for driving the belt drive motor 304 and transmits a predetermined drive parameter to the drive control unit 306. The control unit 111 includes a storage unit (memory) (not illustrated) that stores values of a plurality of driving frequencies, currents for driving the drive motor 304.

The drive control unit 306 has a structure of including a current control unit 307 and a frequency control unit 308 inside thereof, sets a current value or a driving frequency value according to the drive parameter information transmitted from the control unit 111, and sends the values to the drive output unit 305. The current control unit 307 and the frequency control unit 308 may not be separate control unit structures as illustrated but may be one control unit using an integrated circuit such as a central processing unit (CPU), an Application Specific Integrated Circuit (ASIC), or a Field Programmable Gate Array (FPGA).

The drive output unit 305 converts a current value or a driving frequency value set for driving the belt drive motor 304 sent from the drive control unit 306 to a current or a driving frequency, sends the current or the driving frequency to the belt drive motor 304, and operates the belt drive motor 304.

A detection sensor 309 is mounted on the transporting line 301, and recognizes that the sample container 201 reaches the belt 303. The detection sensor 309 is connected to the control unit 111 via a detection unit 310 and a detection control unit 311. When the sample container 201 reaches the belt 303, and the sensor detection signal is input to the detection sensor 309, the sensor detection signal is sent to the detection unit 310. The detection unit 310 sends the sensor detection signal from the detection sensor 309 to the detection control unit 311 as the input signal. The detection control unit 311 inputs the detection by the corresponding detection sensor of the corresponding transporting line 301 by the input signal which is the sensor detection signal sent from the detection unit 310, that is, the reaching of the sample container 201 at a desired position, to the control unit 111, as information. The drive control unit 306 and the detection control unit 311 may not be separate control unit structure but may be one control unit structure using a common CPU, a micro IC, or the like.

After the input signal is sent from the detection unit 310, during the certain period, the control unit 111 has a function of monitoring the input signal sent from the next detection unit 310, that is, whether the sample container 201 reaches the corresponding transporting line 301, again. The sample charging unit 101 and the liquid amount measurement processing unit 104 in the sample transporting system 100 (not illustrated) are connected to the control unit 111. Therefore, the sample recognition unit of the sample charging unit 101 (not illustrated) can transmit the container type information of the transported sample container 201 to the control unit 111. The liquid amount measurement processing unit 104 measures the amount of the sample that fills the transported sample container 201 and transmits the result thereof to the control unit 111 as the sample amount information. The control unit 111 calculates the weight of the corresponding sample container 201 from the container type information of the corresponding sample container 201 transmitted from the sample charging unit 101 and the sample amount information of the corresponding sample container 201 sent from the liquid amount measurement processing unit 104.

Figure 4:
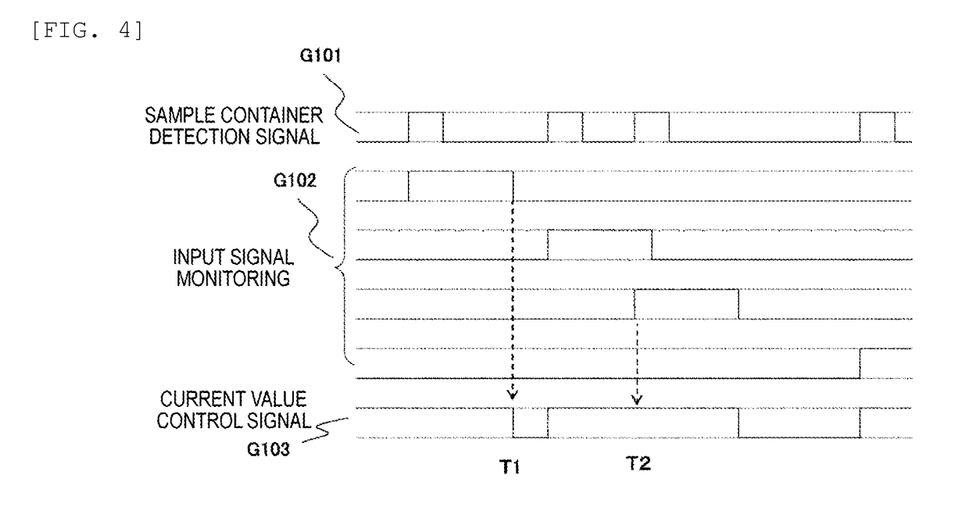
FIG. 4 is a waveform diagram illustrating a current value control timing of a belt drive motor according to Embodiment 1.

Subsequently, with respect to FIG. 4, the control of the current value of the belt drive motor according to the present embodiment and the effect thereof are described. FIG. 4 is a waveform diagram illustrating a current value control timing of the belt drive motor of the transporting line according to the present embodiment. The waveform is indicated by a high-low two-level signal of as illustrated. If the detection sensor 309 detects the sample container 201, a sample container detection signal G101 becomes high for a predetermined period of time, and the control unit 111 recognizes the detection of the sample container 201.

At this point, the control unit 111 performs an input signal monitoring G102 for detecting the sample container 201 by the next detection sensor 309. The control unit 111 performs monitoring whenever the detection sensor 309 detects the sample container 201 as illustrated in the sample container detection signal G101.

If the detection sensor 309 does not detect the next sample container 201 within a certain monitoring time after the detection of the sample container 201 by the detection sensor 309, the drive parameter information of which the current value is reduced more than that during the general driving of the belt drive motor 304 from the control unit 111 is sent to the drive control unit 306, the current control unit 307 inside the drive control unit 306 sends a low-level current value controlling signal G103 for setting the current value lower than that as usual to the drive output unit 305 (T1). The drive output unit 305 to which the current value controlling signal G103 for installing the current value lower than that as usual is sent converts the current to a current lower than that as usual, sends the current to the belt drive motor 304, and operates the belt drive motor 304.

Meanwhile, after the detection sensor 309 detects the sample container 201, if the detection sensor 309 detects the next sample container 201 within a certain monitoring time by the control unit 111, the drive parameter information of the current value during the usual driving of the belt drive motor 304 from the control unit 111 is sent to the drive control unit 306, the current control unit 307 inside the drive control unit 306 sets the current value as usual and sends the current value to the drive output unit 305 (T2). In this case, the drive output unit 305 converts the current to the current as usual, sends the current to the belt drive motor 304, and operates the belt drive motor 304.

If the current value flowing through the belt drive motor 304 is caused to be lower than the value flowing as usual, the belt drive motor 304 is driven with the driving force lower than usual, that is, the driving torque lower than usual. In addition, it is recognized that the driving sound of the belt drive motor 304 is reduced by decreasing the driving torque, and thus the noise reduction becomes possible with the transporting line 301.

As the drive control unit 306 that drives a motor such as the belt drive motor 304, a drive controlling method of a motor using a microcomputer IC called a motor controller is exemplified, and the motor controller may have a function of reducing a current flowing through a general motor called power save. However, in the situation of the device on which the motor is mounted, the power save by the motor controller is a function of stopping the supply of the current to the corresponding motor or reducing the current value when the corresponding motor controlled by the motor controller stops driving, and is a function different from the function of reducing the current value flowing through the motor during the driving according to the situation, as described above in the present embodiment.

Figure 5:
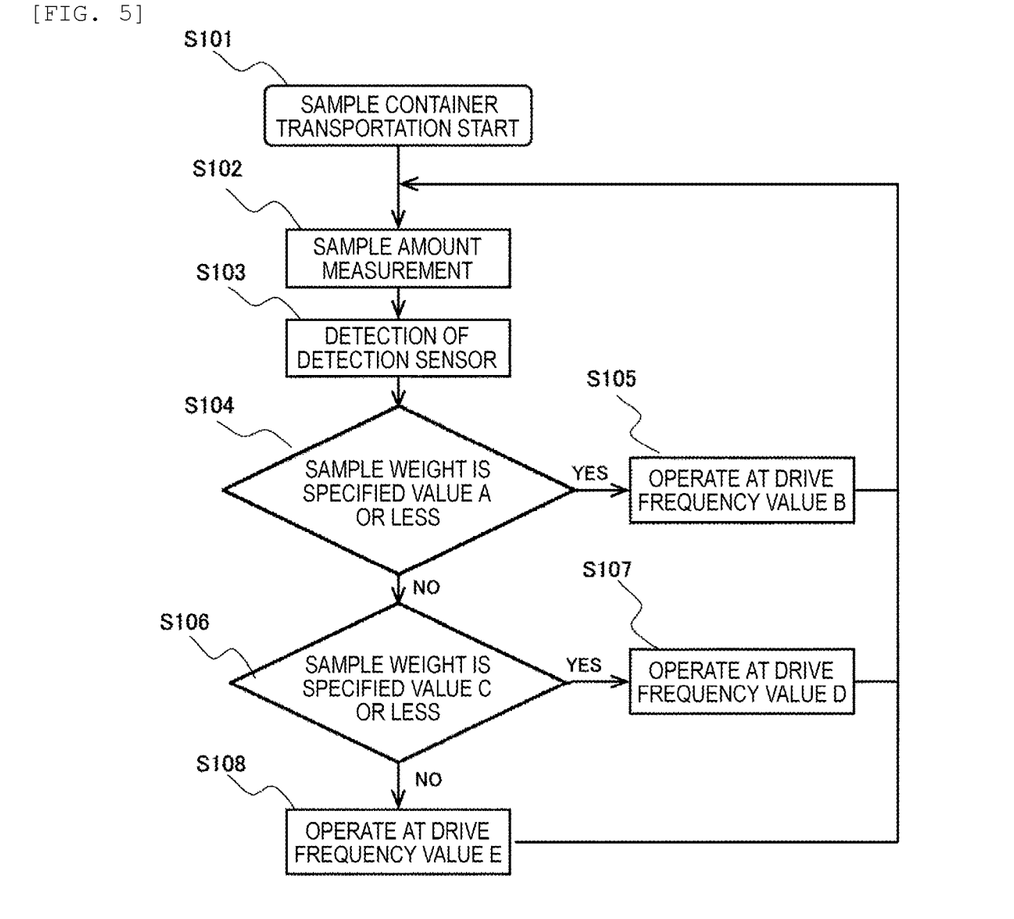
FIG. 5 is a flowchart illustrating frequency control of a belt drive motor of a transporting line according to Embodiment 1.

Subsequently, with reference to FIG. 5, a control processing flow of the frequency control of the belt drive motor which is the driving unit by the drive control unit according to the present embodiment and the effect thereof are described. FIG. 5 illustrates an example of a flowchart illustrating the frequency control of the belt drive motor according to the present embodiment.

The sample container 201 charged in the sample charging unit 101 of the sample transporting system 100 is started to be transported to the transporting line 301 of the sample transport unit 110 (Step S101). The liquid amount measurement processing unit 104 measures the sample amount of samples that fills the sample container 201 by the processing by each mechanism in each unit such as the centrifugal processing unit 103 (Step S102), the sample amount information is sent to the control unit 111, and the control unit 111 calculates the weight of the corresponding sample container 201 in combination with the container type information of the corresponding sample container 201 transmitted from the sample charging unit 101.

A plurality of items of drive parameter information such as a value of the driving frequency and a value of the current that drive the belt drive motor 304 according to the weight of the sample container 201 and the length of the transporting line 301 are stored in the storage unit in the control unit 111. Here, two types of the weight specified value of the sample container 201 and the driving frequency values according thereto are described. The drive parameter information is not limited to two types, and three or more types may be used to achieve noise reduction of the sample transporting system by controlling the driving unit in multiple stages. That is, the control unit 111 uses the plurality of driving frequencies, currents stored in the storage unit and changes the values of driving frequencies, currents in multiple stages according to the number of samples or the amount of samples or according to the number of samples and the amount of samples, to drive the driving unit.

When the detection sensor 309 mounted at a predetermined position of the transporting line 301 detects the sample container 201 (Step S103), the weight of the sample container 201 on the transporting line 301 is compared with a specified value A stored in the control unit 111 (Step S104). If the weight of the corresponding sample container 201 is the specified value A or less (YES), the drive parameter information of a driving frequency value B stored in the control unit 111 according to the weight specified value A of the sample container 201 is sent to the drive control unit 306, the frequency control unit 308 inside the drive control unit 306 sets the driving frequency of the driving frequency value B and sends the driving frequency to the drive output unit 305, the drive output unit 305 converts the driving frequency to the driving frequency of the driving frequency value B and sends the driving frequency to the belt drive motor 304, and the belt drive motor 304 is operated (Step S105).

Meanwhile, in Step S104, if the weight of the sample container 201 is the specified value A or more (NO), the weight of the sample container 201 is compared with a second specified value C stored in the control unit 111 (Step S106). If the weight of the sample container 201 is the specified value C or less (YES), the drive parameter information of a driving frequency value D stored in the control unit 111 according to the weight specified value C of the sample container 201 is sent to the drive control unit 306, and the belt drive motor 304 is operated at the driving frequency of the driving frequency value D in the same manner as in Step S105 (Step S107).

In Step S106, if the weight of the corresponding sample container 201 is the specified value C or more (NO), the drive parameter information of a driving frequency E stored in the control unit 111 is sent to the drive control unit 306, and the belt drive motor 304 is operated at the driving frequency of a driving frequency value E in the same manner as in Step S105 (Step S108).

In this manner, the driving frequency value that drives the belt drive motor 304 is changed based on the weight of the sample container 201 or the length of the transporting line 301 to drive the belt drive motor 304 at different driving frequency values respectively for the plurality of transporting lines 301 with different lengths which are installed in the sample transporting system 100, to shift the driving sound of the belt drive motors 304 and the frequency of the rotating sound of the pulleys 302 or the belt 303 when the belt drive motors 304 are simultaneously driven with the plurality of transporting lines 301, so that the driving sound or the rotating sound in the sample transporting system 100 can be relatively reduced. Accordingly, it is possible to form the operation environment in which the noise is reduced as the sample transporting system 100.

The reason for providing a specified value by the weight of the sample container 201 is because it is likely that the natural frequency of the transporting line 301 changes according to the weight of the sample container 201 transported on the transporting line 301 to strengthen the driving sound or the rotating sound due to the resonance to the driving frequency value, and thus it is required to set the driving frequency value with respect to the natural frequency of the transporting line 301 including the weight of the sample container 201. Therefore, the weight specified value of the sample container 201 is not necessarily limited to the single sample container 201, but is defined by the sum of the weights of the plurality of sample containers 201 when the plurality of sample containers 201 are transported to the transporting line 301.

According to the present invention described above, also with respect to the transporting line, the current value or the driving frequency of the drive motor is changed based on the number and the amount of transported samples to change the driving torque and the driving rotary speed of the transporting line so that noise reduction is achieved by driving the motor under suitable conditions according to the amount and number of the transported samples and by reducing the operation sound of the driving motor or mechanism and the like.

The present invention is not limited to the above-described examples, but includes various modifications. For example, FIG. 5 illustrates the control processing flow when the frequency of the belt drive motor of the transporting line is controlled, but the current may be controlled by the current control unit, or both of the driving frequency and the current may be controlled by the drive control unit based on the number and the amount of samples, and further the length of the transporting line or the like. In addition, the above embodiment is specifically described for better understanding of the present invention and is not necessarily limited to include all the configurations of the description.

REFERENCE SIGNS LIST

100: sample transporting system
101: sample charging unit
102: sample storage unit
103: centrifugal processing unit
104: liquid amount measurement processing unit
105: opening processing unit
106: child sample container generation processing unit
107: dispensing processing unit
108: plugging processing unit
109: analysis processing unit
110: sample transport unit
111: control unit
201: sample container
202: plug
203: holder
301: transporting line
302: pulley
303: belt
304: belt drive motor
305: drive output unit
306: drive control unit
307: current control unit
308: frequency control unit
309: detection sensor
310: detection unit
311: detection control unit

The invention claimed is:

1. A sample transporting device comprising:
a transport unit configured to transport a sample to a predetermined position along a transporting line;
a driving unit configured to drive the transport unit;
a drive control unit configured to control the driving unit by a driving frequency;
a detection unit configured to detect the sample on the transport unit and generate a corresponding sample detection signal;
a sample amount measurement unit configured to measure an amount of the sample; and
a control unit configured to determine a sample weight of the sample based on the amount of the sample measured by the sample amount measurement unit and process the sample detection signal of the detection unit,
wherein the control unit outputs a value of the driving frequency to the drive control unit and controls so that the driving unit is driven by the corresponding driving frequency;
wherein the control unit processes the sample detection signal and selects the driving frequency; and
wherein the driving frequency is selected as a first driving frequency in a first case in which the sample weight of the sample is equal to or less than a first weight value, is selected as a second driving frequency in a second case in which the sample weight is greater than the first weight value but less than or equal to a second weight value, and is selected as a third driving frequency in a third case in which the weight value is greater than the second weight value.

2. The sample transporting device according to claim 1, wherein the control unit includes a storage unit that stores values of a plurality of driving frequencies.

3. A sample transporting system comprising:
a preprocessing unit configured to preprocess the sample;
an analysis processing unit configured to analyze the sample subjected to the preprocessing; and
the sample transporting device according to claim 1 configured to transport the sample between the preprocessing unit and the analysis processing unit.

4. A method of transporting a sample, comprising:
transporting the sample to a predetermined position along a transporting line by using a transport unit driven by a driving unit controlled by a driving frequency;
detecting the sample on the transport unit by a detection unit and generating a corresponding sample detection signal by the detection unit;
measuring an amount of the sample;
determining, by a control unit, a sample weight of the sample based on the measured amount of the sample; and
performing control so that the driving unit is driven according to a value of the driving frequency;
wherein the control unit processes the sample detection signal and selects the driving frequency; and
wherein the driving frequency is selected as a first driving frequency in a first case in which the sample weight of the sample is equal to or less than a first weight value, is selected as a second driving frequency in a second case in which the sample weight is greater than the first weight value but less than or equal to a second weight value, and is selected as a third driving frequency in a third case in which the weight value is greater than the second weight value.

5. The method of transporting a sample according to claim 4, wherein the control unit selects a value of the driving frequency for driving the driving unit from values of a plurality of driving frequencies stored inside the control unit.

* * * * *